May 16, 1933.  R. M. GALLOWAY  1,908,973
ROTARY FLUID FLOW CONTROL VALVE
Filed June 12, 1928   5 Sheets-Sheet 1

Fig.1.

Inventor
Robert M. Galloway
By Attorneys
Nathan & Bowman

May 16, 1933.   R. M. GALLOWAY   1,908,973
ROTARY FLUID FLOW CONTROL VALVE
Filed June 12, 1928   5 Sheets-Sheet 4

Inventor
Robert M. Galloway
By Attorneys
Nathan & Bowman

Patented May 16, 1933

1,908,973

UNITED STATES PATENT OFFICE

ROBERT M. GALLOWAY, OF RICHMOND, INDIANA, ASSIGNOR TO THE NATIONAL AUTO-
MATIC TOOL COMPANY, OF RICHMOND, INDIANA, A CORPORATION OF INDIANA

ROTARY FLUID FLOW CONTROL VALVE

Application filed June 12, 1928. Serial No. 284,696.

The present invention relates to a control means for governing the operation of a pressure fluid power means adapted to operate certain devices such as a machine tool head required to move in a definite cyclic manner. More specifically the invention is concerned with a complete self-contained valve unit adapted to be mounted on the device actuated and automatically controlled by its movement.

For efficient operation of a machine tool it is necessary that the translatable elements or carriers have a combination of slow and fast movements, as well as movements in forward and reverse directions. For example, the cutting tool must travel at a relatively slow speed during its working operation, whereas the advance of the cutting tool to a position adjacent the work and the retraction of the cutting tool may, and should for an efficient operation, move at a relatively rapid rate.

Although the characteristics and advantages of fluid propulsion have long been known, yet its adaptation to the operation of machine tools has involved various problems not at first apparent such that its adoption has therefore not been as rapid and universal as might at first be expected. The valve control means heretofore designed for accomplishing the cycle of operation noted above have been relatively complicated and of special construction in each case for the particular machine tool to which it was applied.

Many of these types of valve control means were mechanically operated by positive connections and were slow in shifting from one step of the cycle to the next, resulting in a relatively sluggish and inaccurately timed cycle. Attempts have been made to vary the speed of the operated element by causing the main control valve to expose more or less of normal port opening to the flow of fluid, but such means have involved difficulties in dependable operation thereof and in accurate positioning of the valve during successive cycles.

The present invention obviates these disadvantages in a very efficient manner and does so by providing a valve means having a plurality of conduit connections with one end of the power cylinder. These conduits are of unequal capacity and are selectively opened in a definite timed cycle by a corresponding movement of a main valve member. A very simple means for varying the timing of the valve member in accordance with the particular type of machine and work to be performed, is also provided.

The actuating means for the valve comprises an organization of elements and features which cooperate to impart a very quick accurately timed movement of the valve and one which causes the valve to assume its various positions in a very accurate and reliable manner. The valve is adapted to occupy an initial position which corresponds to the position of rest of the machine tool table or other element actuated. To initiate the cycle the valve is moved to a position wherein it is engaged by a latch mechanism to definitely position it for the first step in the cycle of operation. A very convenient manner for causing this initial movement is accomplished through admission of fluid pressure to an actuating element connected to the valve, such means permitting of a remote control of the valve. A positive means such as a spring or other fluid pressure means is adapted to act on the valve tending constantly to urge it in a definite direction against the first setting means just described and to hold the valve in a definite position against the latch mechanism. Thereafter, the valve is tripped by means movable in timed relation with the actuated device, the valve thereby being released in a step by step manner to occupy definite positions, determined by a stop mechanism, for controlling the fluid and thereby causing the power operated mechanism to move through a series of steps of the desired speed and direction, the valve at the end being returned to the initial position of rest.

Various constructions of valves have been designed having latch mechanisms for tripping the valve to permit movement thereof, but such valves have not been capable of controlling a plurality of conduits of unequal capacity leading to a common cylinder end nor to permit successive movements of the valve in the same direction.

A primary feature of this invention resides in the provision of a valve control means capable of functioning in the above manner which control means consists of a complete self-contained valve unit adapted to be mounted upon any of the various machine tools and to control it in a manner particularly desired in that type of machine and in accordance with the special type of work cycle to be performed. The construction permits of a standardization and economy of production and the result is a compactness not heretofore attained in a similar control mechanism designed to impart such a variety of movements to the valve member and thereby a series of different movements of the operated device.

As an important feature of the construction, all of the actuating elements are completely enclosed within a casing, there being no valve stems or control rods projecting from the casing which are exposed to the high pressures of the power fluid. The connections to the valve consist practically entirely of fluid connections. Any of the leakages which normally occur in a valve control device, in the present construction, find their way into the drain pipe. The achievement of such a leak-proof valve is especially desirable and difficult to accomplish in a control means of this type in view of the variety of actuating means involved and the extremely high pressures which are often utilized in a hydraulic propulsion means of this type.

Other objects of invention include the specific arrangement of the elements in a very compact and close construction, the details and advantages of which will be more apparent from the detailed description thereof. The construction also includes the provision of a regulating valve for varying the capacity of one of the conduit means, such regulating means being very conveniently positioned and so arranged as to contribute to the general compactness and unity of the valve and valve actuating mechanism.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figs. 7 to 12 show details of the valve rotor, Fig. 7 being an elevation thereof. Fig. 10 is a similar cross-sectional view taken on the line 10—10 of Fig. 7.

Figure 1:
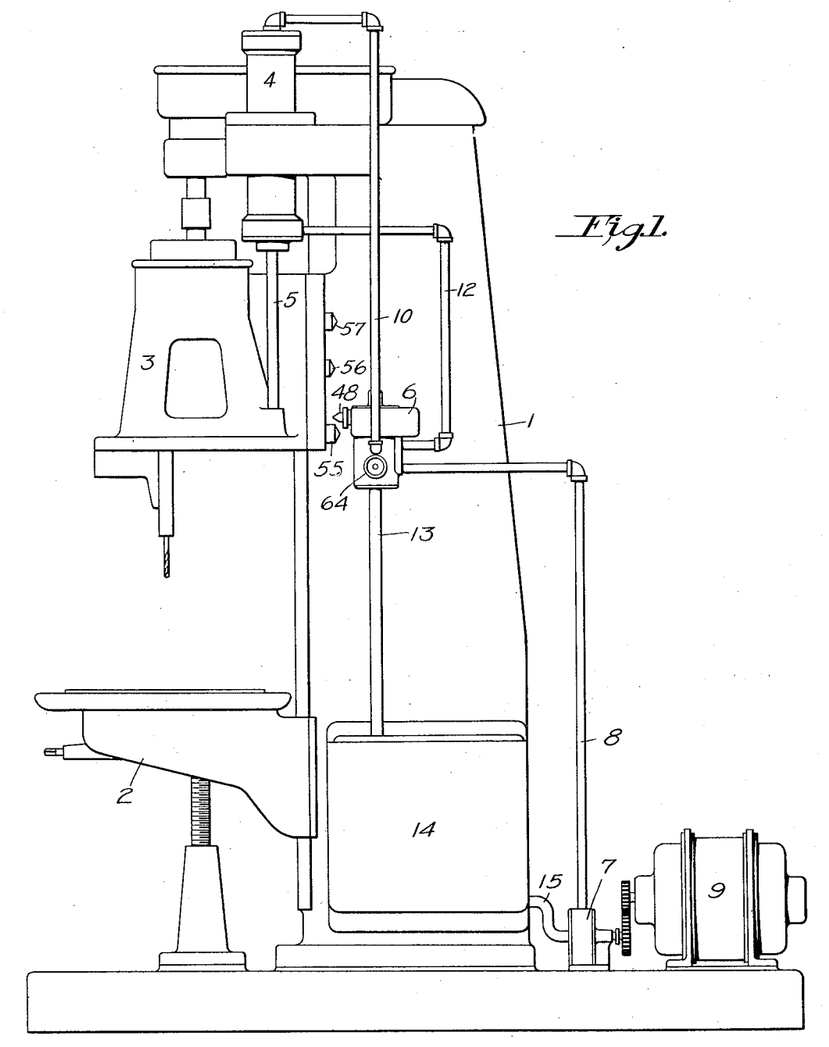
Fig. 1 is a view in elevation of a drilling machine having incorporated therein the fluid propulsion and control means illustrative of a practical adaptation of the present invention.

Fig. 1 illustrates a particularly advantageous application of the use of this type of valve in which it is employed to control the operation of a fluid pressure power cylinder adapted to translate a drill head.

The general features comprise an upright frame 1 and having thereon the work table 2 and the translatable tool carrying head 3. The upper end of the frame 1 carries a cylinder 4 in which moves a piston connected to the rod 5 which in turn is connected to the tool head 3 for translation of the latter.

The valve unit is shown at 6 adapted to be removably secured on the frame. High pressure fluid such as oil is supplied to the valve 6 from the pump 7 delivering fluid through the conduit 8 connected in the casing of the valve 6. The pump is adapted to be driven by any suitable means such as the electric motor 9. Conduit 10 connects the valve casing with the upper end of cylinder 4 and conduit 12 with the lower end of cylinder 4. Pipe 13 leads the exhaust from the valve to the sump or reservoir 14 from which it is drawn by the pump 7 thru the pipe 15. A control of the valve is provided, to be later described, which causes the head 3 to partake of a series of movements in accordance with the work to be performed.

Figure 2:
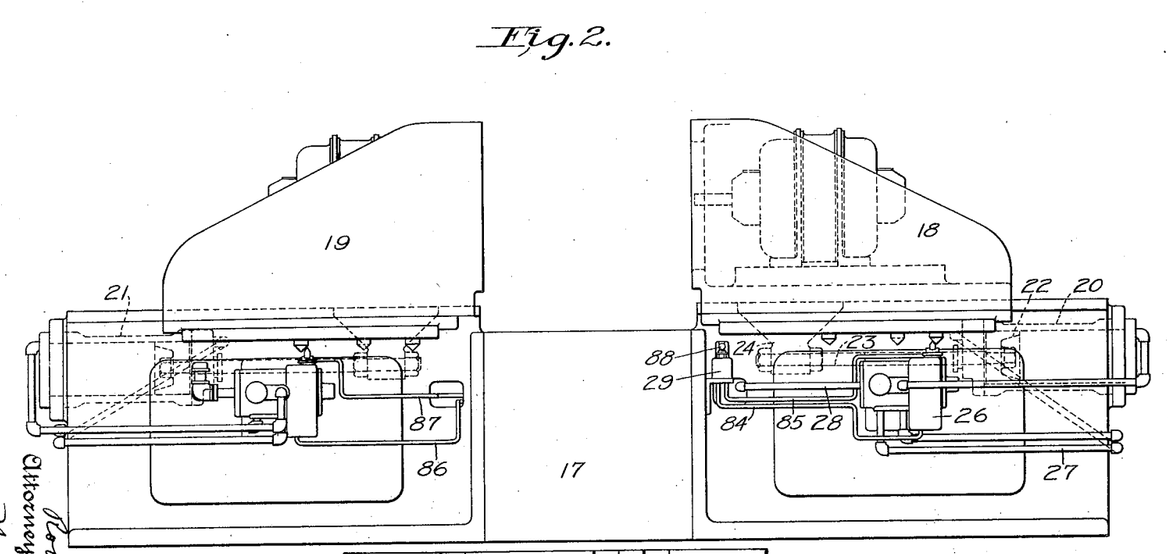
Fig. 2 illustrates another application of the control means in a multiple head way drill.

A further application and incorporation of the valve unit in a machine tool is shown in Fig. 2, which consists of what is commonly known as a two-way drilling machine having the base 17 carrying thereon the opposed translatable heads 18 and 19, having the hydraulic power cylinders 20 and 21 respectively. As shown in the right of Fig. 2 a piston 22 is movable in the cylinder 20, the piston being secured to a piston rod 23, which has secured thereto the bracket 24 integral with the base portion of the translatable head 18. Removably mounted on the frame is a valve unit 26 similar to the valve unit 6 of Fig. 1, the valve casing being connected to the opposite ends of the cylinder 20. The pipe 27 is connected with a source of fluid under pressure and the pipe 28 is adapted to be connected with a reservoir mounted in the machine tool base. The elements thus far described are substantially duplicated in the hydraulic actuating means at the left and need not therefore be described in detail. At 29 is shown a four way air valve adapted to be connected to each of the valve control units in a manner and for a purpose to be later described.

Figures 3, 4, 14:
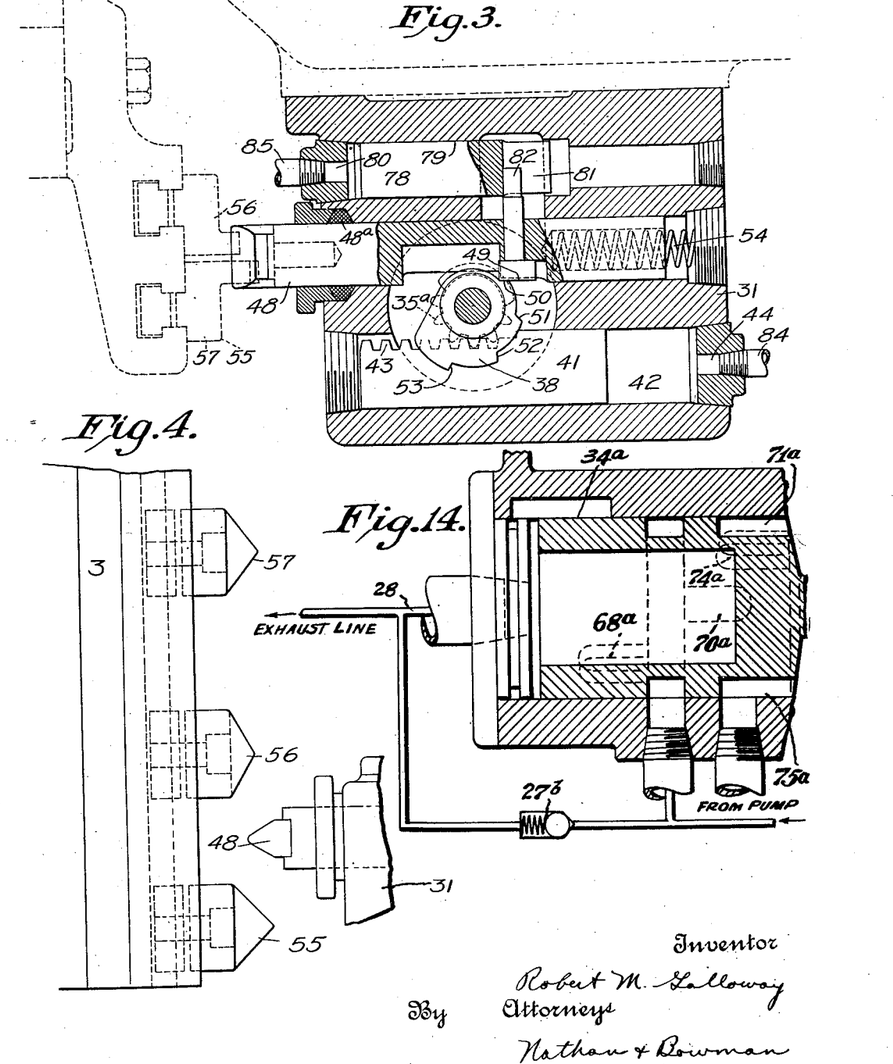
Fig. 3 is a somewhat fragmentary view illustrating the automatic operation of the valve mechanism by movement of the translated device.
Fig. 4 is a view similar to Fig. 3 taken at right angles thereto.
Figs. 13 and 14 show a modified form of valve particularly adaptable in multiple-way machines, Fig. 13 being a developed surface of the valve rotor similar to Fig. 12, and Fig. 14 being a fragmentary somewhat diagrammatic view with the valve in the position occupied when the corresponding head is in its retracted position.

The details of the valve unit will now be described in detail, and referring first to Figs. 5 and 6 such unit consists of a casing 31 adapted to house the valve member and entire actuating mechanism therefor. The housing 31 is provided with a removable cover 32 at one end thereof and a plate 33 at the opposite end. A suitable chamber is provided in the housing within which is mounted the valve member or rotor 34 having integral therewith the shaft 35 having fixed thereon the rack gear 35a. The shaft 35 terminates in a reduced portion 36 which has a bearing in the boss 37 of the cover 32. Mounted on the reduced portion is the cam member 38. Thrust bearing 39 is interposed between a shoulder formed by the cam 38 and the cover 32. The valve rotor is adapted to be intermittently rotated in one direction by a mechanism consisting of a piston 41, operable in the cylinder 42, the piston 41 carrying rack teeth 43 engaging with the rack gear 35a. Air admitted to the cylinder 42 through the opening 44 serves to rotate the shaft and cam 38 in a clockwise direction in Fig. 3. Rotation in this direction is resisted by a coil spring 45 conveniently housed within the hollow rotor 34, said spring being under tension at all times and tending to urge the valve in a counter clock-wise direction, as shown in Fig. 3. The tension of the spring 45 may be varied by removing the screws 46, one of which is shown in Fig. 6, and rotating the plate 33, the openings for the screws 46 being equally spaced to permit such adjustment. The spring 45 also tends to urge the valve inwardly against the thrust bearing 39, the valve thereby being entirely free from play. The mechanism thus far described, it may be seen, is arranged in a very compact manner and housed entirely within the casing 31.

After the valve is set or moved from its initial position, an interference mechanism including the cam 38 is operative to positively hold it in predetermined positions and adapted to be successively released to permit the valve to be moved in a step by step manner to govern the movement of the translatable head 3. This operation is automatic and consists of a slide 48 carrying a stop member 49 adapted to be successively engaged by shoulders 50, 51, 52 and 53 of the cam 38. Suitable packing is provided at 48a for the slide 48. The slide 48 is continuously urged outwardly by means of a spring 54. The latch is successively tripped to permit the step by step movement of the valve by means of the dogs 55, 56 and 57, adjustably mounted on the head 3.

Two conduit means leading to the upper end of the cylinder 4 are shown, one being through opening 59 leading directly to pipe 10, while the other is through opening 60 leading through the adjustable regulating valve 61 and passage 62 to the pipe 10. The latter described passage is restricted and adjustable as to the effective opening through the valve 61 whereby the fluid flowing therethru during the cutting portion of the tool traverse, may be regulated as desired to govern the speed of the tool head. A very accurate and dependable control of the slow speed may be accomplished by reason of the nature of the opening in the valve member 61 which consists of a single relatively elongated slot 63. Axial adjustment of the valve member 61 exposes more or less of a longitudinal portion of this slot. The dimensions, therefore, of the effective opening for even a very restricted flow are of such proportions that no extremely narrow regions are presented which will permit of the lodging of minute particles of dirt. The valve stem 61 has a screw threaded portion thereon, whereby rotation of the stem by means of the hand grip 64 operates to move the valve longitudinally, the amount of adjustment being indicated by the scale means 65.

The path of the fluid through the valve and the actuation thereof will now be described more in detail. For the particular cycle of operation to be described the valve rotor 34 is adapted to occupy four positions which are: 1st, rapid forward traverse; 2nd, slow speed forward traverse; 3rd, rapid reverse traverse; and 4th, stop and relief position. Each position requires a movement of 45°, the four positions or a complete cycle requiring a movement of 135°.

Figure 5:
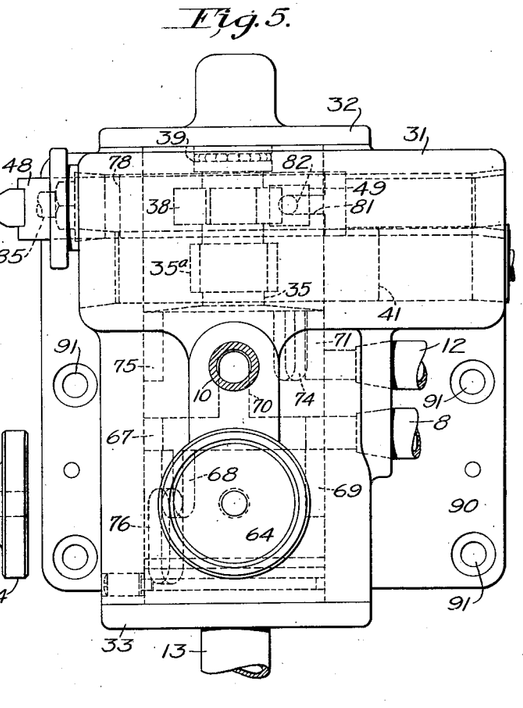
Fig. 5 is an enlarged view of the valve unit enclosed in its casing.
Figure 6:
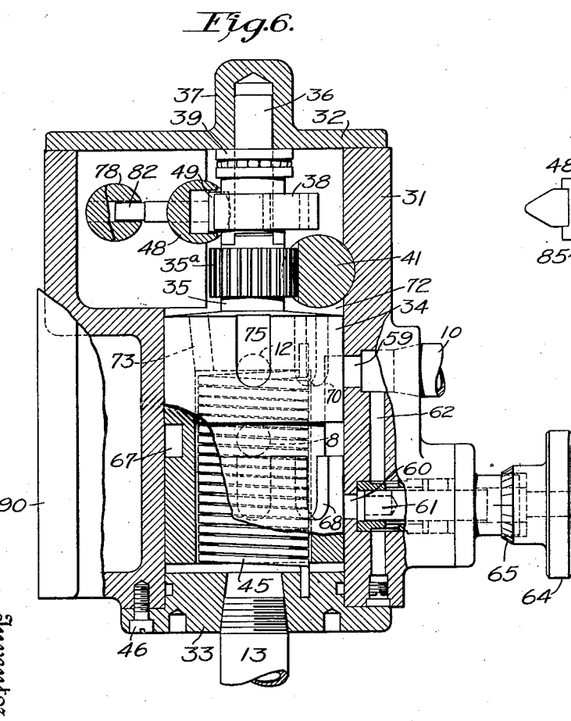
Fig. 6 is a similar view looking from the left in Fig. 5 and with sections broken away to illustrate details of the operating mechanism.
Figures 7, 10:
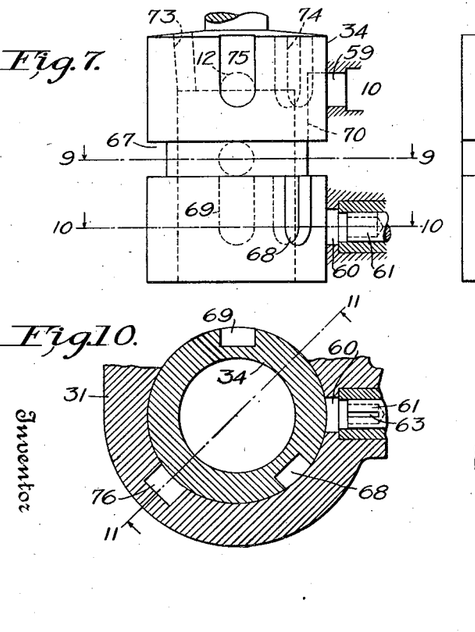
Figure 8:
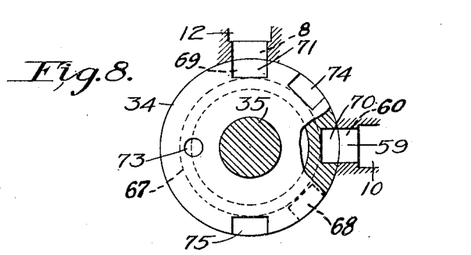
Fig. 8 is a top plan view of Fig. 7.
Figure 9:
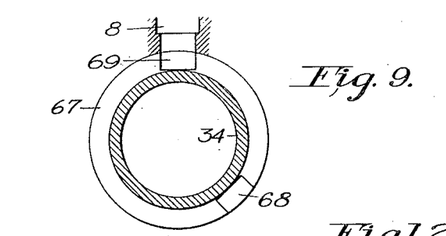
Fig. 9 is a cross-sectional view of the valve taken on the line 9—9 of Fig. 7.

In Figs. 5 and 6 the valve is shown in the first or rapid traverse forward position. The hydraulic fluid supplied through pipe 8 enters an annular groove 67 of the rotor from which it passes into a series of slots, 68, 69 and 70. The slot 70 in this position of the valve communicates with the port 59, fluid thereby being supplied at a rapid rate to the upper end of cylinder 4. At the same time fluid is exhausted from the lower end of cylinder 4 through pipe 12 and slot 71 formed in the rotor surface. Passage 71 opens into a chamber 72 of the valve casing from where it passes through opening 73 of the rotor and through the hollow interior of the rotor and out the pipe 13 to the reservoir. As the head 3 moves downwardly trip dog 56 engages slide 48 moving it to the right an amount sufficient to permit the cam 38 and the rotor to rotate in a counter clock-wise direction in Fig. 3 until the shoulder 51 engages the stop 49. The rotor is thus moved 45° to the 2nd position under force of the spring 45.

In this 2nd or slow speed position fluid flows from the groove 67 through slot 68 opening 60 through the regulating valve 61, passage 62 and pipe 10 at a reduced rate to the upper end of the cylinder 4. Slot 74 of the rotor now communicates with pipe 12 to permit the continued exhaust from the lower end of the cylinder 4. As the head moves on its slow working stroke, trip dog 57 engages the slide 48 releasing the stop 49 and permitting the cam 38 to rotate until the shoulder 52 thereof engages the stop 49. The valve is now in its position corresponding to the reverse movement of the head.

In this 3rd or rapid traverse position the high pressure fluid from groove 67 flows through slot 70 and out pipe 12 to the lower end of cylinder 4, while the fluid in the upper end of cylinder 4 is displaced and forced out through the pipe 10 through slot 75 into the chamber 72 from whence it flows to the exhaust. As the tool head 3 moves up the trip dog 55 engages the slide 48 to release stop 49 from shoulder 52 permitting the cam and valve to rotate until shoulder 53 engages the stop 49. This brings the valve to the stop position in which the head remains at rest until a new cycle is initiated.

Figures 11, 12:
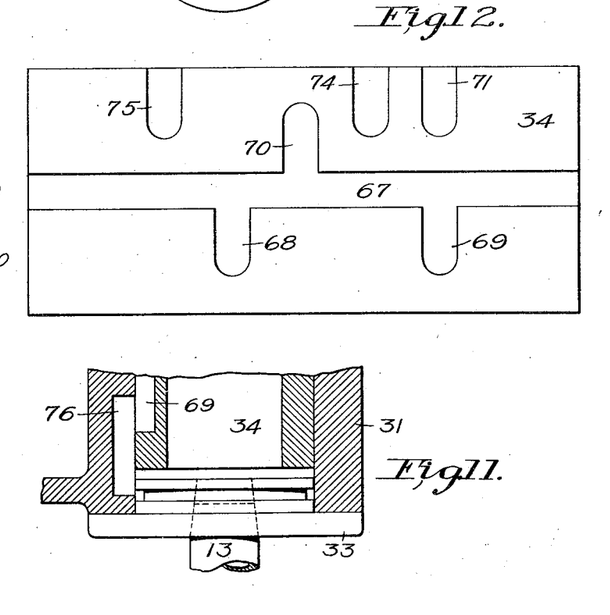
Fig. 11 is a cross-sectional view taken on line 11—11 of Fig. 10
Fig. 12 shows a developed surface of the valve rotor.

In this stop and relief position the fluid from the groove 67 passes through slot 69 and a communicating slot 76 formed in the inner surface of the housing, as shown in Fig. 11, and out through the opening at the lower part of the valve to the exhaust. The outlet just described serves to relieve the pump of all pressure during this position of rest at the completion of the cycle, and the pump is, therefore, now freely operating until a new cycle is initiated by admission of air to the cylinder 42 to reset the valve in its first position.

Figure 13:
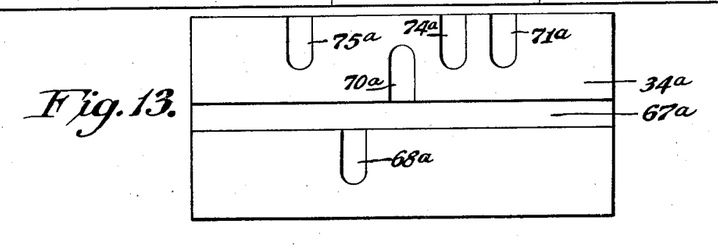

The valves employed in the type of machine shown in Fig. 2 may be very similar to that just described, with the exception that in this valve the slot 69 in the rotor is omitted, whereby when the valve reaches its 4th position corresponding to the stop position of the head, the pump is blanked off by the rotor, or in other words no relief is provided, the pump continuing to act against the usual pressure, an auxiliary relief valve being provided in the usual manner to permit exhaust. This type of control valve and operation is necessary where a pump supplies fluid to more than one fluid operating device. Since, if the valve in its 4th position should open the pump to relief, no pressure would thereby remain to continue the actuation of the remaining one or more heads supplied from the same pump in case they had not yet completed their stroke. Fig. 13 shows the developed surface of a valve 34a suitable for this purpose. It will be seen that Fig. 13 is practically the same as Fig. 12 except that it has no opening 69, the various corresponding ports being designated by the same numerals with the suffix a. In Fig. 14 is shown partly diagrammatically the fluid connections and relations of the openings when the valve is in the position corresponding to the retracted stop position of the tool head 18. In this position of the valve, the supply line 27 from the pump is blanked off and pressure is maintained therein to operate the opposed tool head in the event that it has not completed its cycle. A relief valve for the pump is diagrammatically shown at 27b this valve usually being incorporated in the pump itself. It may be seen that with the arrangement just described the various heads may be operated from the same pump irrespective of the cycle and that the cycles need not bear any time relation to the other ones supplied from the same pump.

It often occurs that during the operation of a machine tool it becomes desirable or even necessary to stop the forward progress of the tool and return it to its initial retracted position. An emergency trip is incorporated in the present unit to accomplish this function. This emergency trip is best shown in Fig. 3 and consists of a piston 78 slidable in the cylinder 79 formed in the valve casing. Air is admitted to the cylinder through the port 80 by a manually operable valve to be later described. The inner end of the piston 78 is provided with a notched opening 81 within which fits the end 82 of a shaft integral with the stop 49. The stop 49 may therefore be moved to the right in Fig. 3 by means of the slide 48 independently of the piston 78. Admission of air to the cylinder 79 however, causes the piston 78 to move the stop 49 to its extreme right hand position which is determined by the inner end of the piston 78 engaging the shoulder formed by the reduced diameter portion of the cylinder 79 wherein the cam is rotated until the shoulder 52 engages the stop 49 which position is that wherein fluid is admitted to the lower end of the cylinder 4 to move it to its retracted position of rest. After the emergency trip has been operated as described the actuation of the mechanism is the same as during the normal automatic cycle. As the piston and tool proceed on their reverse movement caused by the admission of fluid to the cylinder 79, the dog 55 engages the slide 48 which disengages the stop 49 from the shoulder 52 permitting the cam to rotate until shoulder 53 engages stop 49 which is the stop and relief position. This additional movement of slide 48 under the action of trip dog 55 is permitted through the medium of the slot 81 in the piston 79 allowing the pin 82 to move further to the right in Fig. 3 after the piston 79 has moved to its extreme position to the right.

A very convenient remote control for the emergency trip means and for setting the valve to initiate the cycle is shown in Fig. 2 consisting of a manually operable valve 29, adapted to selectively admit air to either the pipe 84 leading to the cylinder 42 or to the pipe 85 leading to the emergency trip cylinder 79. Branch pipes 86 and 87 connecting with pipes 84 and 85 respectively are also provided for simultaneous operation if desired of the valve unit to the left in Fig. 2. The valve 29 may be any well known type of valve capable of accomplishing the functions described, such as the well known Ross four-way air valve, in which the handle 88 rocks about a horizontal axis having a normal or neutral position wherein both the pipes 84 and 85 are open to the atmosphere. Rocking of the handle 88 in one direction admits air under pressure from any suitable source to pipe 84, and rocking of the handle in the opposite direction admits air under pressure to the pipe 85. Though not shown it may be apparent that a suitable control such as that just described may be provided in Fig. 1.

It may be now clearly seen that the valve control means consists of a simple compact complete unit capable of being easily assembled in conjunction with a fluid operating means upon any type of machine or device, wherein a member is adapted to be operated in accordance with a predetermined cycle, such as that described herein with respect to the specific types of machine tools shown. For ready assembling and removal, the valve unit is provided with a base portion 90, having bolt holes 91 therein for securing it on the frame of the actuated device.

The valve is entirely free of joints which are liable to leakage since there are no valve stems or rods of any kind which are subjected to the high pressures of the hydraulic fluid and which project through the casing. The operating mechanism is entirely enclosed and amply lubricated.

Without further analysis, the foregoing will so fully reveal the gist of this invention that others can, by applying current knowledge, readily adapt it for various utilizations by retaining one or more of the features that, from the standpoint of prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. Fluid actuating means comprising a fluid motor; valve control means therefor; a plurality of conduit means of unequal capacity connecting said valve means to said motor to effect different speeds in the same direction; impositive means for urging said valve in one direction; means for moving said valve in the opposite direction against said impositive means; interference means for restraining said valve in one position against said impositive means to permit flow thru one of said conduit means; and means for tripping said interference means to permit said valve to open a second one of said conduit means.

2. A complete self-contained control valve unit for hydraulic transmissions combining a casing having a port adapted to be connected with a fluid pressure line, and having first and second fluid conduits adapted to be connected with the transmission, and control means in said casing comprising a valve for controlling the flow of fluid from said pressure line to said conduits; means to move said valve from an initial position to another position to effect a predetermined flow through one of said conduits; means tending to return said valve to its initial position; retaining means to hold said valve in its adjusted position; first means to render said retaining means ineffective thereby to permit said valve to be moved to an intermediate position to vary the flow of fluid; and second means to render said retaining means ineffective to permit said valve to be returned to its initial position.

3. A completely enclosed valve assembly comprising a casing; a plurality of fluid conduits connected to said casing; and operative parts within said casing including a valve member movable to a plurality of positions therein to control the flow of fluid through said conduits, impositive means for urging said valve in one direction, means for moving said valve in the opposite direction against said impositive means; interference means for holding said valve in predetermined positions against said impositive means; and means extending thru said casing adapted to be successively actuated to trip said interference means to release said valve to its successive positions.

4. A completely enclosed leak proof valve and actuating mechanism comprising a casing having a plurality of fluid conduits connected thereto and operative parts within said casing including a valve movable to a plurality of positions therein to control the flow of fluid through said conduits, spring means normally urging said valve in one direction, fluid pressure means for moving said valve in the opposite direction against the force of said spring, interference means for holding said valve in predetermined positions against the force of said spring, and means extending from said casing adapted to be actuated to release said valve.

5. A complete self contained valve unit for controlling the fluid to a fluid motor comprising a casing and having mounted therein valve means; a plurality of conduit means of unequal capacity adapted to connect said valve means with the fluid motor and to be controlled by said valve means; impositive means for urging said valve means in one direction; means for moving said valve in the opposite direction against said impositive means; and means for positioning said valve in predetermined operative positions.

6. A self contained control valve unit adapted to be selectively mounted on a fluid pressure actuating device comprising a casing having a plurality of fluid conduits connected thereto and having therein, a valve member; impositive means for urging said valve in one direction; fluid pressure means for moving said valve in the opposite direction against said impositive means; interference means for restraining said valve in predetermined positions; and fluid pressure means for tripping said interference means at will.

7. A complete self contained control valve unit adapted to be mounted on a fluid pressure actuated device comprising a casing having a plurality of fluid conduits connected thereto and enclosing a valve member; impositive means for constantly urging said valve member in one direction; fluid pressure means for moving said valve in the opposite direction against said impositive means; interference means for restraining said valve in a predetermined position against said impositive means; manually controlled fluid pressure means operable at will to trip said interference means; and mechanical means adapted to be automatically actuated in accordance with the movement of said device for tripping said interference means.

8. A valve unit comprising a casing; a plurality of fluid conduits connected to said casing; a rotary shaft mounted therein; a valve member connected to be operated thereby; impositive means tending to rotate said shaft in one direction; means for intermittently rotating said shaft in the opposite direction; interference means for releasably holding said valve means in a plurality of operative positions; and means adapted to be successively tripped to cause said valve to successively occupy said operative positions.

9. A control valve for fluid actuating means comprising a casing having inlet and exhaust means; a valve member therein; a rotary shaft connected to operate said member; cam means connected to be rotated by said shaft; impositive means tending to rotate said shaft and cam means in one direction; stop means adapted to engage said cam means to successively restrain said valve in predetermined positions; and means adapted to be actuated to progressively trip said stop means.

10. A control valve for fluid actuating means comprising a casing having inlet and exhaust means; a valve member therein; a rotary shaft connected to operate said valve member; a stepped cam mounted on said shaft; means tending to rotate said shaft and cam in one direction; stop means adapted to selectively engage said cam means whereby said valve is restrained in corresponding predetermined positions; and means adapted to be successively operated to permit said cam and valve to progressively advance.

11. A rotary fluid flow control valve comprising a casing having inlet and exhaust means; a valve member rotatively mounted therein adapted to control said means, cam means rotatable with said valve; means tending to rotate said valve and cam means in one direction; stop means cooperable with said cam means to restrain said valve in predetermined positions against said rotating means; and means adapted to actuate said stop means to permit a step by step advance of the cam and valve member.

12. A complete self contained leak proof control valve unit comprising a casing having a plurality of fluid conduits connected thereto and having mounted therein, a rotary valve member; cam means rotatable with said member; impositive means tending to rotate said valve member in one direction; fluid pressure operated means for intermittently rotating said valve in the opposite direction; stop means adapted to engage said cam means to restrain said cam and valve member in predetermined positions; and means adapted to successively actuate said stop means to permit said valve to be progressively moved through a cycle of flow control positions under the influence of said impositive means.

13. A complete self contained valve unit combining a casing having inlet and exhaust ports and having mounted in said casing a hollow rotary valve member provided with fluid passages cooperable with said ports; spring means mounted within and connected to said valve member to urge its rotation in one direction; means for intermittently rotating said valve in the opposite direction against said spring means; interference means for restraining said valve in a predetermined position against said spring means; and means for tripping said interference means.

14. A self contained valve and valve actuating unit for fluid propulsion means comprising a casing having inlet and exhaust passages and having mounted in said casing, a rotary valve member; stepped cam means rotatable therewith; spring means tending to rotate said valve in one direction; a fluid pressure operated rack connected to rotate said valve member in the opposite direction against the tension of said spring means; stop means adapted to selectively engage the stepped portions of said cam means to restrain it against the force of said spring means; and means to successively actuate said stop means to permit a corresponding step by step rotation of said cam means and valve member.

15. A completely enclosed leak-proof control valve unit for propulsion motors comprising a casing having a valve bore therein; a hollow valve member mounted within said bore; fluid connections adapted to communicate with a source of fluid under pressure and with a motor opening laterally into said bore and adapted to be controlled by passages in the periphery of said valve member; and operating mechanism for said valve member located within said casing, and an exhaust conduit connected directly to said bore and hollow opening whereby the unit is rendered substantially leak-proof.

16. A complete self contained valve and control mechanism for fluid propulsion motors adapted to be removably mounted as a unitary assembly on a suitable frame combining a casing; a plurality of conduits for connecting said casing with said motor; an adjusting valve in one of said conduits capable of being set in selective positions to vary the flow through the corresponding conduit; fluid exhaust and inlet connections to said casing; a movable valve means in said casing; and mechanism enclosed in said casing for operating said valve member comprising impositive means for urging said valve in one direction, means for setting said valve in an initial position against the force of said impositive means, and releasable interference means for locking said valve in successive operative positions.

17. A complete unitarily assembled valve and control mechanism for fluid propulsion motors adapted to be removably mounted as a unit on a suitable support combining a casing; a plurality of conduits for connecting said casing with the motor; conduits for connecting said casing with a source of supply and to exhaust; a movable valve member in said casing; and mechanism enclosed in said casing for operating said valve member comprising impositive means tending to move said valve in one direction, means for moving said valve against said impositive means to an initial position, interference means for locking said valve in predetermined operative positions of a cycle, and means for successively tripping said interference means to permit said valve member to successively occupy said predetermined positions.

18. A complete unitarily assembled valve means for fluid actuating motors combining a casing; a valve member movably mounted therein; a plurality of fluid conduits connected to said casing, and arranged to be controlled by said valve member; and means located in said casing for actuating said valve member to control the motor through a cycle of movements comprising impositive means connected to urge said valve in one direction, fluid pressure means adapted to be intermittently operated to move said valve member against said impositive means to an initial operative position, interference means to lock said valve member in predetermined operative positions against said impositive means, and means adapted to be actuated by the movement of the motor to successively trip said interference means to permit said impositive means to move said valve member through a series of operative positions.

19. A complete unitarily assembled valve means for fluid actuating motors combining a casing; a valve member movably mounted therein; a plurality of fluid conduits connected to said casing; and means mounted in said casing for actuating said valve member to control the flow of fluid through said conduits and thereby a cycle of movements of said motor comprising impositive means connected to urge said valve member in one direction, means adapted to be intermittently operated to move said member in the opposite direction to an initial operative position, stepped cam means to lock said valve member in predetermined operative positions against said impositive means, and a trip member engageable with cam means and projecting outwardly through said casing and adapted to be successively operated by movement of the actuated device to permit a step by step movement of said cam means and valve member under the pressure of said impositive means.

20. A complete enclosed valve unit for a fluid actuating motor combining a casing; a valve member movably mounted thereon; fluid conduits of unequal capacity connecting said casing with one end of said motor and adapted to be controlled by said valve member to successively produce different speeds of said motor in the same direction; and means located within said casing for actuating said valve member comprising impositive means for urging said valve member in one direction, fluid pressure means for moving said valve member in the opposite direction against said impositive means to an initial operative position, interference means for locking said valve member in successive predetermined positions against said impositive means, and means adapted to be operated in accordance with the movement of said motor to trip said interference means to permit said valve member to occupy said successive positions.

21. A leak-proof valve and control mechanism for fluid propulsion motors organized as a unitary assembly and adapted to be removably mounted as a unit on a suitable support combining a casing; valve means movably mounted in said casing; fluid conduits therefrom for connection with the motor; an inlet connection; an exhaust connection, the interior of said casing being in communication with and exposed only to the pressure of the exhaust line; and means enclosed in said casing for operating said valve means comprising impositive means for urging said valve means in one direction, fluid pressure means having a fluid connection through said casing for moving said valve in the opposite direction against said impositive means, releasable trip means for locking said valve means in successive operative positions, and a slidable member projecting through said casing and engaging with said trip means for operating the latter.

22. A fluid motor adapted to actuate a translatable element; and valve control means therefor adapted to cause said motor to operate according to a predetermined cycle of forward and reverse movements and back to an initial position of rest comprising a valve casing, fluid conduit means connecting said casing to the motor to exhaust and to a source of fluid under pressure, impositive means for urging said valve in one direction, interference means adapted to successively lock said valve in operative positions corresponding with said cycle, trip means actuated in timed relation with the movement of said element for progressively tripping said interference means; and emergency means operable at will for actuating said trip means whereby said impositive means moves said valve to the position corresponding to the reverse movement of said motor, said trip means being automatically operated thereafter in the normal manner whereby said impositive means moves the valve to the position corresponding to the position of rest.

23. A fluid motor for actuating a translatable member; and valve control means therefor comprising a casing having fluid connections to said motor and to exhaust and a source of pressure fluid, impositive means for urging said valve in one direction through a cycle of positions to cause said motor to move through a corresponding cycle of forward and reverse movements and back to a position of rest, means for moving said valve in a direction oppositive to said impositive means to an initial position, interference means for successively locking said valve in said initial and succeeding operative positions, means adapted to be actuated in timed relation with said translatable member for progressively tripping said locking means, through said cycle to the position of rest, and emergency means operable at will for tripping said locking means whereby said impositive means moves the valve to the reverse position, said locking means being tripped in the normal manner at the end of the reverse movement whereby said impositive means then moves said valve to the position of rest.

24. A control valve for fluid motors combining a valve member; impositive means tending to move said valve in one direction; stepped cam means connected to be progressively advanced in accordance with the movement of said valve under the influence of said impositive means; stop means adapted to be moved in accordance with the movement of said motor to progressively release said stepped cam means and valve; fluid pressure emergency means operable at will to move said stop means in the releasing direction; and means for limiting the amount of movement of said fluid pressure means, said fluid pressure means having a loose connection with said stop means whereby the releasing movement may be automatically continued after the operation of said emergency means.

In witness whereof, I hereunto subscribe my name.

ROBERT M. GALLOWAY.

CERTIFICATE OF CORRECTION.

Patent No. 1,908,973.            May 16, 1933.

ROBERT M. GALLOWAY.

It is hereby certified that error appears in the printed specification of the above numbered patent requiring correction as follows: Page 6, line 30, claim 6, before "fluid" insert "manually controlled"; and that the said Letters Patent should be read with this correction therein that the same may conform to the record of the case in the Patent Office.

Signed and sealed this 1st day of August, A. D. 1933.

M. J. Moore.

(Seal)            Acting Commissioner of Patents.